United States Patent [19]

Cooksley

[11] 4,045,293

[45] Aug. 30, 1977

[54] WATER PURIFICATION APPARATUS AND METHOD

[76] Inventor: Ralph D. Cooksley, Apt. 543, South Tower, 1800 Silas Deane Highway, Rocky Hill, Conn. 06067

[21] Appl. No.: 629,273

[22] Filed: Nov. 6, 1975

[51] Int. Cl.² .............................................. B01D 3/02
[52] U.S. Cl. ...................................... 203/10; 203/20; 203/39; 203/40; 202/176; 202/181; 202/182; 202/197; 202/202
[58] Field of Search ............... 202/177, 180, 182, 193, 202/196, 197, 200, 202; 203/10, 39, 40, 20, 11; 55/DIG. 22, DIG. 23; 122/460, 488

[56] References Cited

U.S. PATENT DOCUMENTS

| 1,258,562 | 3/1918 | Harris | 202/182 X |
|---|---|---|---|
| 1,707,453 | 4/1929 | Winogradow | 122/460 X |
| 2,310,399 | 2/1943 | Cox et al. | 203/89 |
| 2,441,361 | 5/1948 | Kirgan | 202/196 |
| 2,925,367 | 2/1960 | Soelberg | 202/200 X |
| 3,011,956 | 12/1961 | Smith et al. | 203/20 |
| 3,020,214 | 2/1962 | Beduhn et al. | 203/20 |
| 3,161,574 | 12/1964 | Elam | 202/236 |
| 3,242,058 | 3/1966 | Ganley et al. | 202/202 |
| 3,456,428 | 7/1969 | Bichet et al. | 203/20 |
| 3,674,650 | 7/1972 | Fine | 202/176 |
| 3,736,234 | 5/1973 | Miyamoto | 202/197 |
| 3,907,683 | 9/1975 | Gilmont | 202/180 X |
| 3,975,241 | 8/1976 | Smith | 202/202 |

*Primary Examiner*—Wilbur L. Bascomb, Jr.

[57] ABSTRACT

A water purification apparatus capable of treating water having impurities producing substantial foaming includes a boiler tank having a water inlet and heater, and a stack portion thereabove containing contact surface means and a heater for heating the contact surface means to a temperature above the vaporization temperature of water. In this manner water droplets which may be carried by the steam vapors from the boiler and/or foam will be immediately vaporized as it comes in contact with the contact surface means. The steam vapors pass through a condenser assembly, and the condensate passes through a filter assembly before storage in a tank. The contact surface means desirably comprises screen members providing a tortuous path and high heat conductivity. Baffle members may be interposed in the flow path for vapors from the boiler tank to the stack. Valves and a control circuit are desirably included to automatically control the volume of water in the boiler, to cut off water flow to components and to drain the assembly upon shutdown.

21 Claims, 15 Drawing Figures

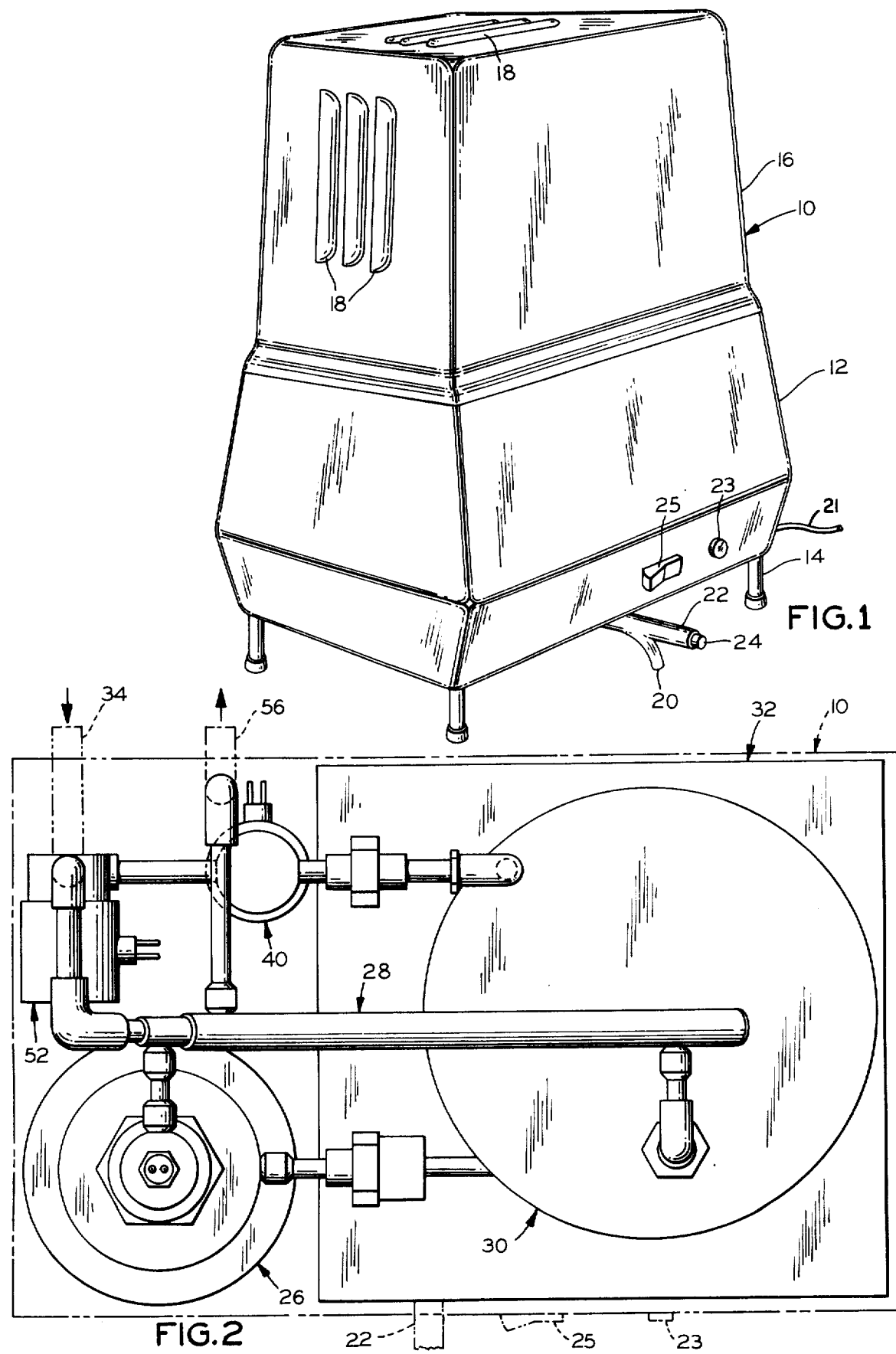

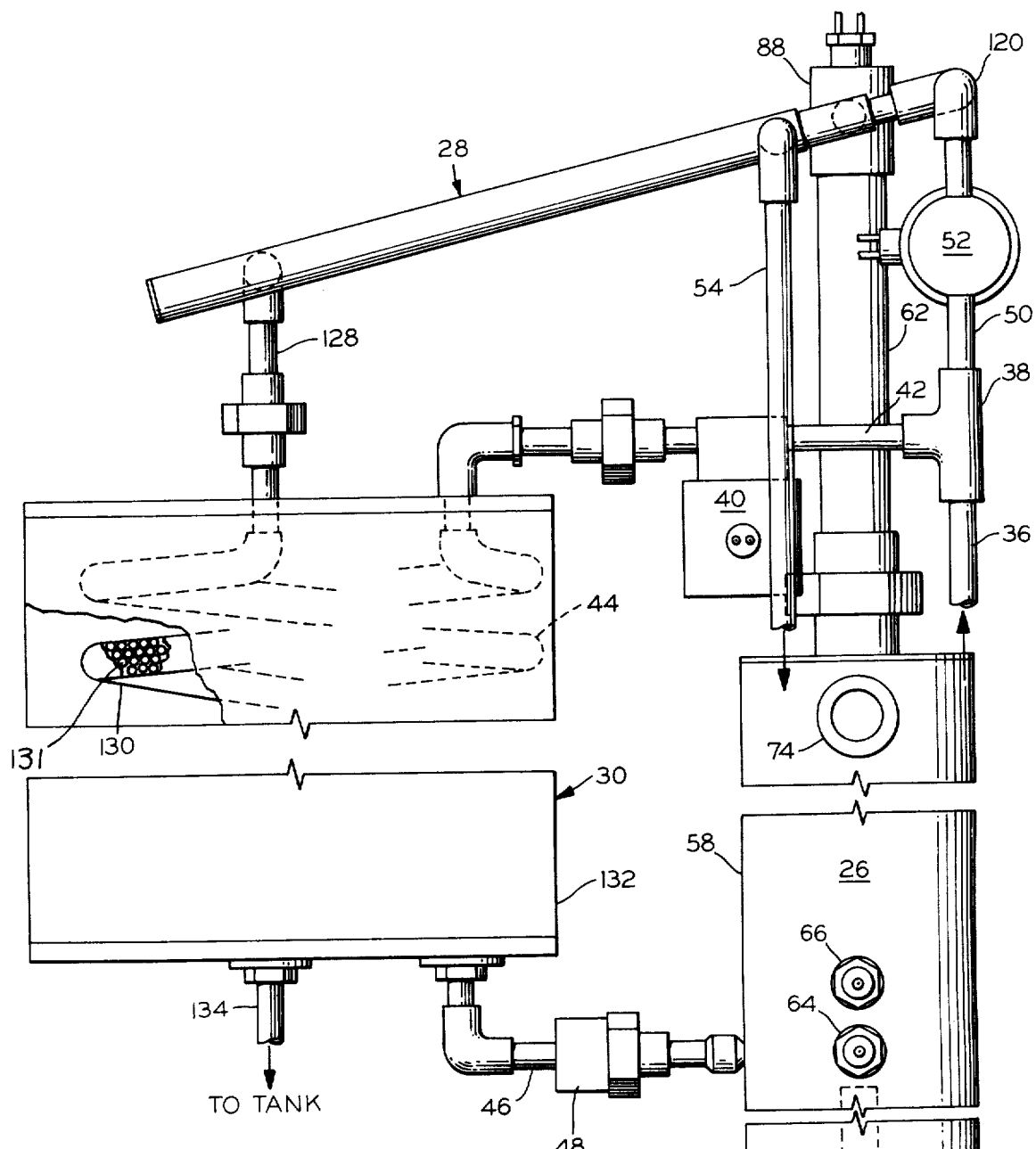
FIG. 3
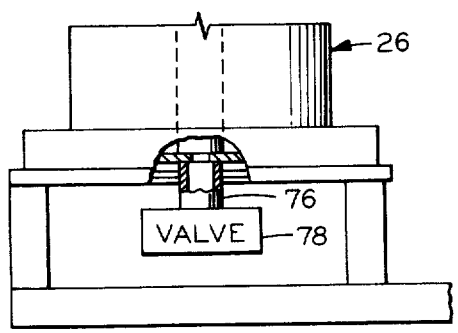
FIG. 4
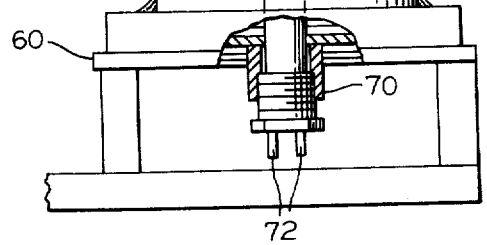

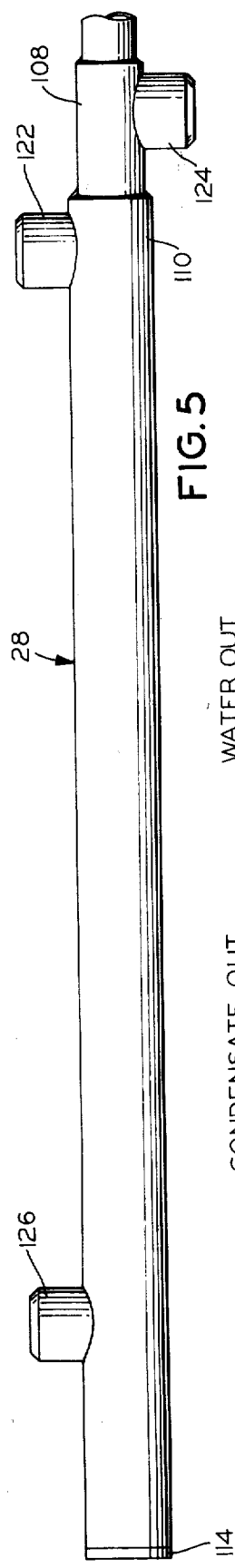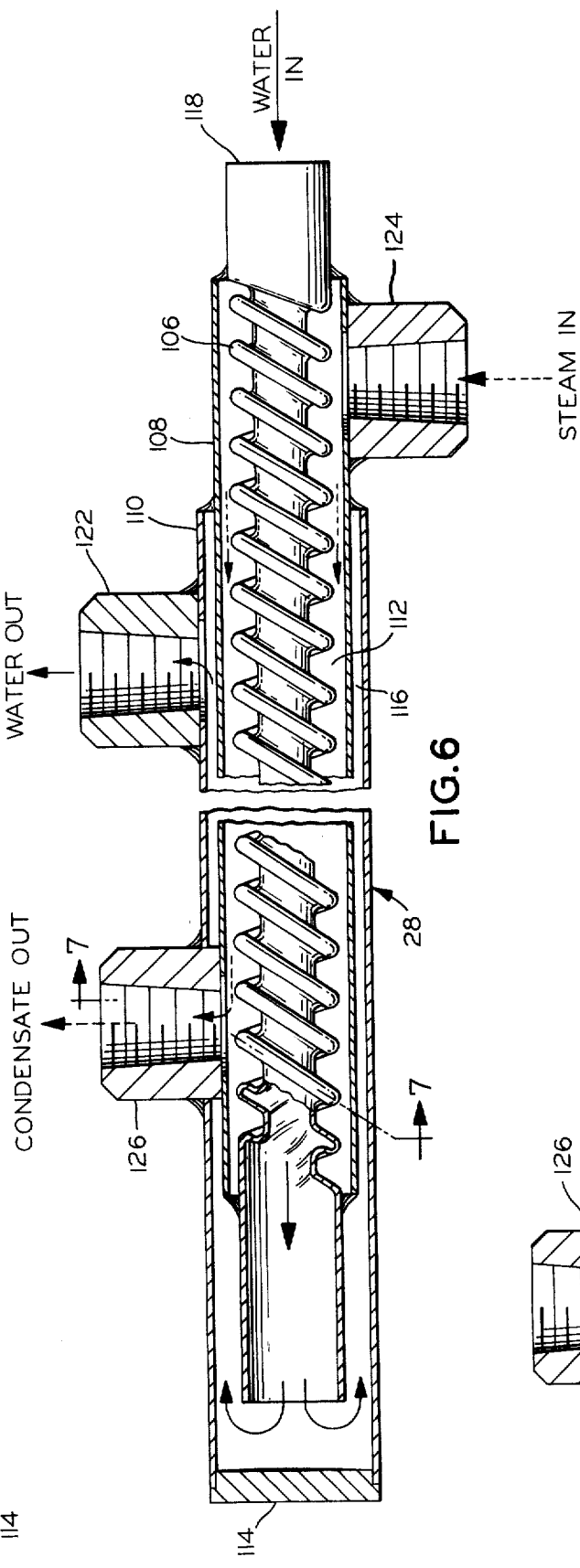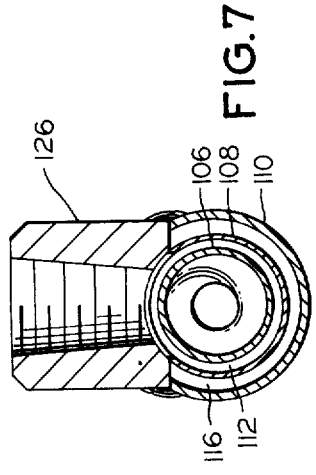

WATER PURIFICATION APPARATUS AND METHOD

BACKGROUND OF THE INVENTION

Many techniques have been employed for the treatment of impure water so as to provide a potable water supply. Generally the most widely employed techniques involving minimum expense utilize distillation of one form or another, with wide variations in the source of heat energy being employed. One of the major impediments to use of distillation involving rapid boiling of the water is the tendency for foaming to occur with certain types of contamination. This foaming often will require excessively large dimensions for the boiler or an intricate and elongated passage from the boiler to the condenser. Moreover, even with water feedstocks which do not evidence substantial foaming, rapid boiling will frequently produce a tendency for water droplets which are carried by the steam vapors into the condenser. As will be readily appreciated, foam droplets or such water droplets will exhibit the contamination of the feedstock and thereby contaminate the condensate which is produced.

Another problem which is frequently encountered in certain sections of the world involves the contamination of the water supply by organic compounds which vaporize along with the water in the boiler. Exemplary of such contaminants are carbon tetrachloride and chloroform which result from chlorination of water supplies containing dissolved methane and other hydrocarbons.

Various types of water purification devices have been suggested for providing potable water in the home, or on shipboard, or in other locations. Many of these devices require substantially continuous operation for efficiency, others require substantial investments, and still others require extensive maintenance from time to time.

It is an object of the present invention to provide a novel water purification apparatus which substantially eliminates carry-over contamination of the condensate.

It is also an object to provide such an apparatus which may be simply and ruggedly constructed to provide a durable and readily serviceable unit.

Another object is to provide such apparatus which is capable of substantially eliminating dissolved gaseous contaminants.

Still another object is to provide such apparatus which may be discontinuously operated, and which, during operation automatically, regulates flow of water into the boiler and which, upon discontinuance of operation, automatically effects draining of the several components.

A further object is to provide a method whereby water feedstock containing impurities may be rapidly and efficiently distilled without carry-over contamination.

SUMMARY OF THE INVENTION

It has now been found that the foregoing and related objects may be readily attained in a water purification apparatus with a boiler assembly having a water-boiling tank portion and a vapor-receiving and conducting portion thereabove. The tank portion includes a water inlet and heating means adapted to heat water therein to the boiling point and produce vaporization thereof, and the vapor-receiving and conducting portion includes a chamber communicating with the tank portion, contact surface means occupying substantially the entire transverse dimension of at least a portion of its chamber and heating means for heating the contact surface means to effect vaporization of water particles which may come into contact therewith. A condenser assembly is connected to the vapor-receiving and conducting portion for receiving vapors passing therethrough and provides indirect heat exchange contact between the vapors and a cooling medium to condense the vapors, and a filter assembly connected to the condenser assembly receives the condensate therefrom to effect filtration thereof. Lastly the filtrate from the filter assembly is received by storage tank means for receiving filtrate.

In the preferred embodiment, the boiler assembly includes baffle members in the passage between the tank portion and the chamber of the vapor-receiving and conducting portion, which uses for its heating means a centrally disposed rod and for the contact surface means a screen member wound about the rod. Preferably a second screen member is disposed below the first screen member and extends transversely of the chamber.

The boiler assembly desirably includes level sensing means for sensing the level of water within the tank portion and water supply means adapted to be connected to a source of water under pressure and the water inlet of the boiler assembly, with a valve in the water supply means for admitting water under pressure to the tank portion. This valve is responsive to a signal generated by the level sensing means to maintain the water level within the tank portion within a predetermined volume. The tank of the boiler assembly may include a drain and a valve operable to open and close the drain for draining water therefrom upon shutdown.

The condenser assembly includes at least a plurality of concentrically disposed tubes defining concentric chambers, one of the chambers communicating with the vapor-receiving and conducting portion for passage of the condensate therethrough and an adjacent chamber communicating with a source of cooling medium to effect heat exchange therebetween. Desirably, the condenser assembly includes three concentrically disposed tubes defining three concentric chambers, the center and outer chambers being interconnected at one end thereof with one of the interconnected chambers being connected to a source of cooling medium at the other end thereof whereby the cooling medium will flow in one direction through one of the chambers and in the opposite direction in the other of the chambers. The intermediate chamber communicates with the vapor-receiving and conducting portion of the boiler assembly for passage of the condensate therethrough in indirect heat exchange contact with the cooling medium flowing in the center and outer chambers. Desirably, the condenser assembly utilizes for cooling medium a connection to a source of water under pressure through a valve.

The filter assembly may also include additional filter means connected to a source of water and to the water inlet of the boiler assembly for filtering water from the source prior to passage into the tank portion. The filter assembly may provide extended filter paths by using an elongated coil and filter medium within the coil.

Control means so desirably provided to supply a signal to the valve in the water supply means connection to the water inlet of the boiler assembly and to supply a signal to the valve in the water supply means to the condenser assembly, so that the control means closes one valve at the time of opening the other valve. The valves are most conveniently electrically actuated and an electric connection to a source of electrical power with a switch therein may be utilized. Upon opening of the switch, the valves in the connections to the sources of water under pressure for condenser means and the water inlet to the tank portion may close and the valve in the drain of the boiler assembly tank may be opened concurrently.

In the water purification method provided hereby, water containing impurities is heated in a boiler tank to produce steam therefrom, and a contact surface member above the boiler tank is heated to a temperature substantially above the boiling point of water. The steam from the boiler tank is passed over the contact surface member to vaporize any entrained water droplets therein, and the steam after passage through the surface contact member is condensed.

The condensate may be passed through a filter medium, and desirably the water is filtered prior to passage to the boiler tank.

BRIEF DESCRIPTION OF THE DRAWINGS

FIG. 1 is a perspective view of a water purification apparatus embodying the present invention;

FIG. 2 is a plan view of the apparatus drawn to an enlarged scale with some elements shown in phantom;

FIG. 3 is a fragmentary rear elevational view of the operating components of the apparatus drawn to an enlarged scale and with portions of internal components drawn in phantom line and with portions of some components broken away to reveal internal construction;

FIG. 4 is a fragmentary front elevational view of the lower portion of the boiler unit illustrating the drain;

FIG. 5 is a plan view to an enlarged scale of the condenser assembly;

FIG. 6 is a fragmentary sectional view of the condenser assembly to a still further enlarged scale;

FIG. 7 is a sectional view of the condenser assembly along the lines 7—7 of FIG. 6;

DETAILED DESCRIPTION OF THE ILLUSTRATED EMBODIMENTS

Figure 8:
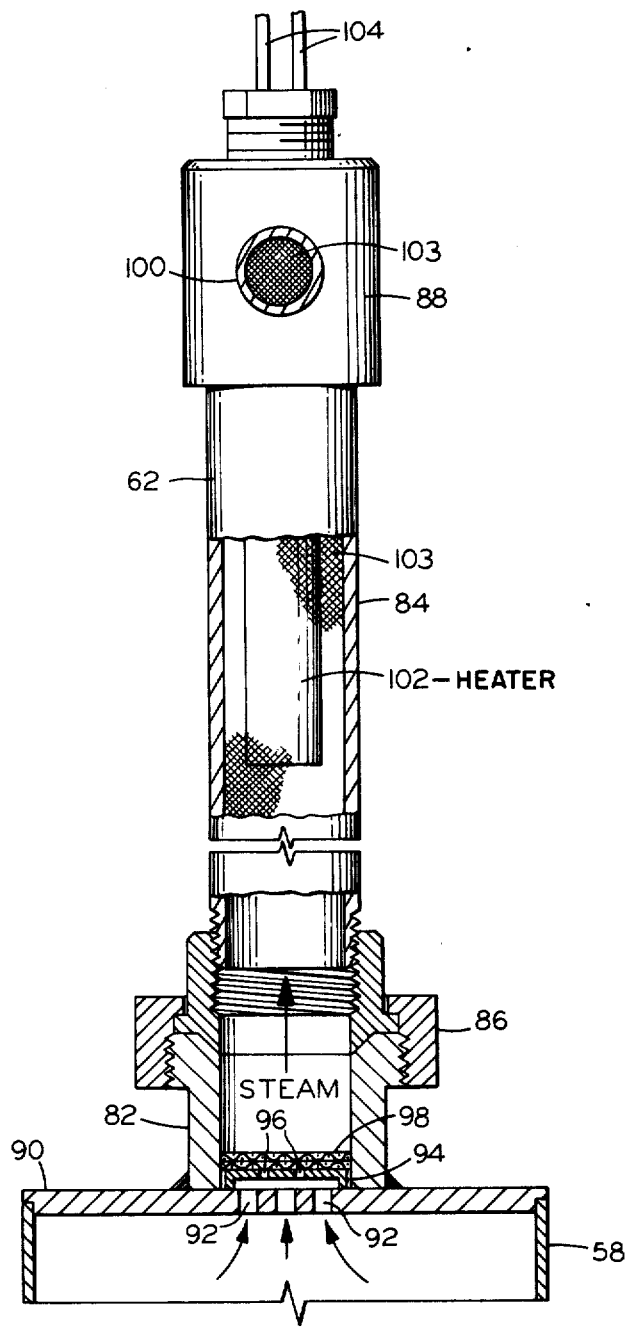
FIG. 8 is a fragmentary rear elevational view to an enlarged scale of the upper portion of the boiler unit with portions broken away to reveal internal construction.
Figure 9:
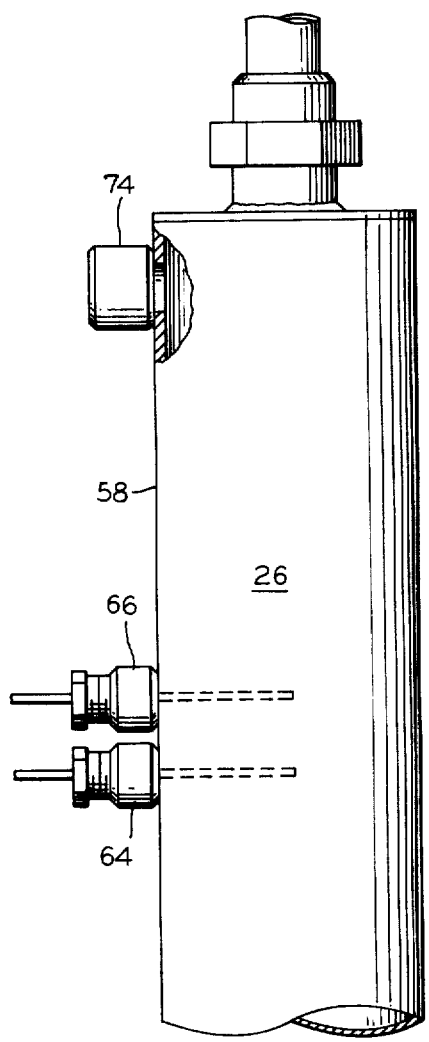
FIG. 9 is a fragmentary side elevational view to an enlarged scale of a portion of the boiler unit with elements illustrated in phantom line and other portions broken away to illustrate internal construction.
Figure 10:
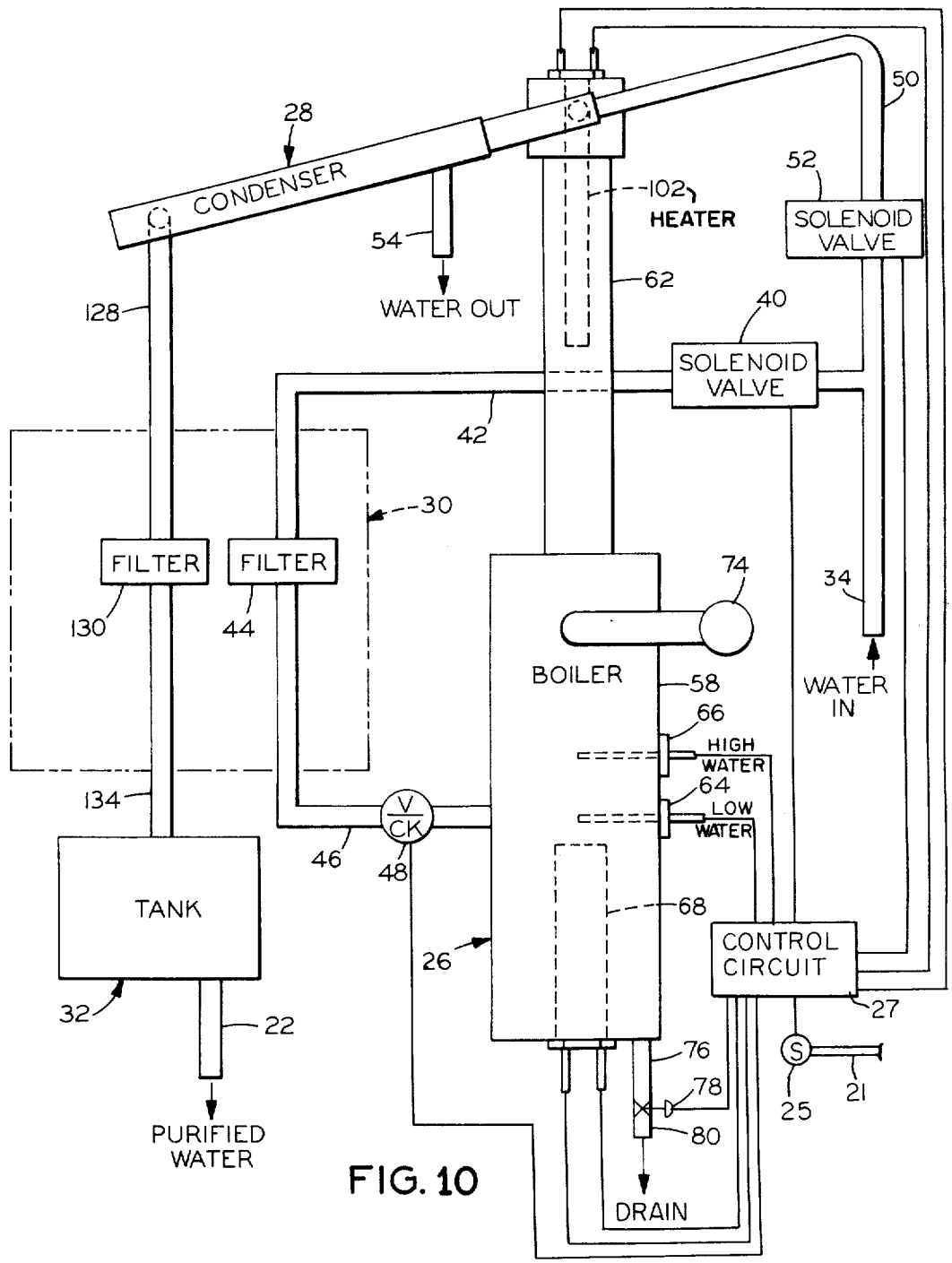
FIG. 10 is a schematic illustration of the components of the water purification apparatus of FIG. 1.
Figure 11:
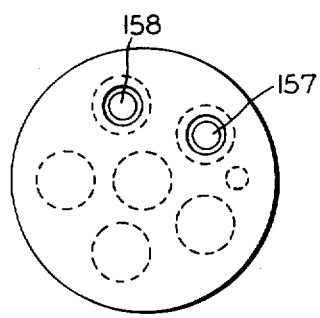
FIG. 11 is a plan view of another embodiment of water filtration unit.
Figure 12:
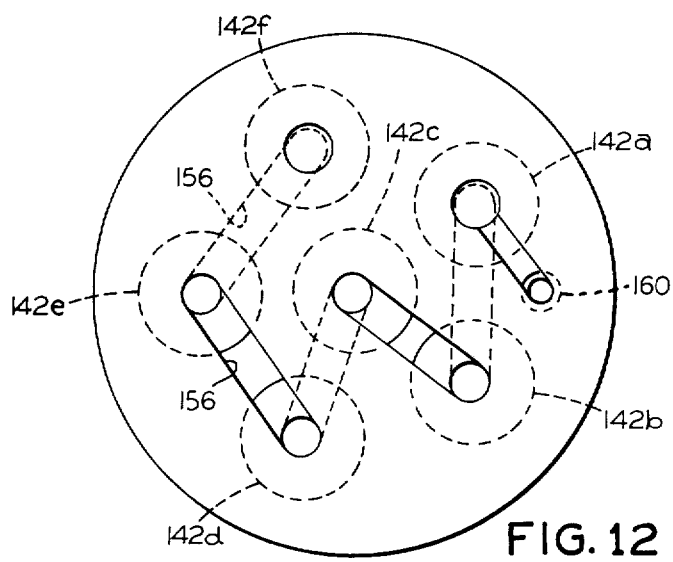
FIG. 12 is a similar view to an enlarged scale with the top cover plate removed and various portions illustrated in phantom line.
Figure 13:
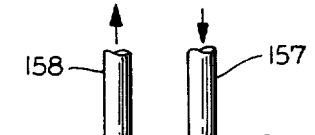
FIG. 13 is a side elevational view of the embodiment of FIG. 11.
Figure 14:
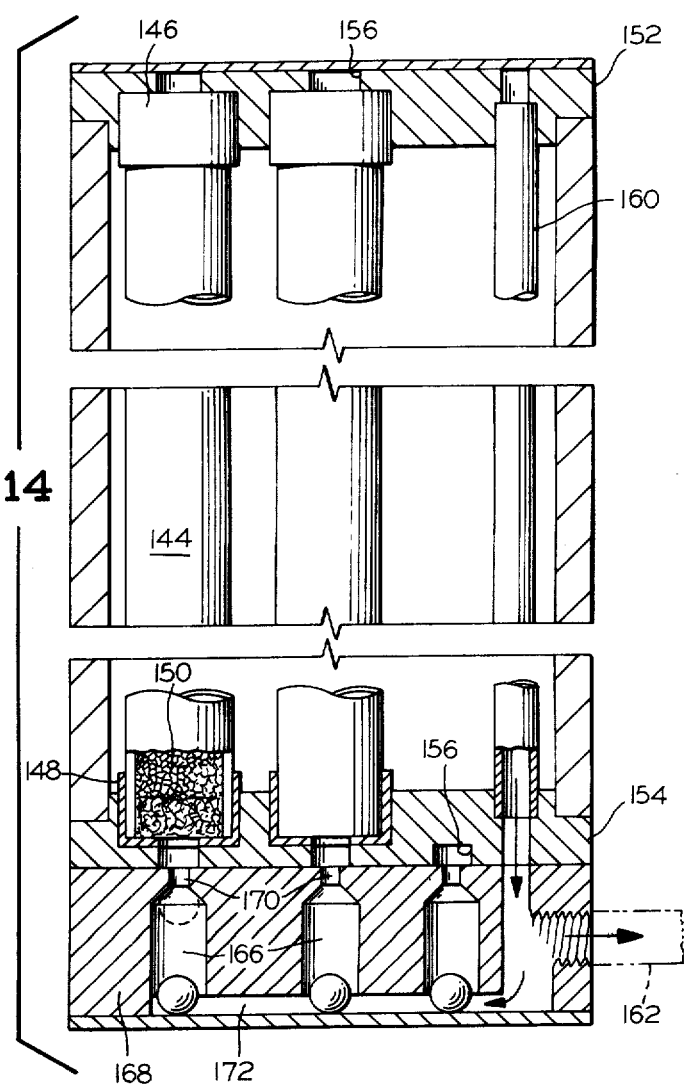
FIG. 14 is a fragmentary vertical sectional view to an enlarged scale with portions of components broken away to reveal internal construction.
Figure 15:
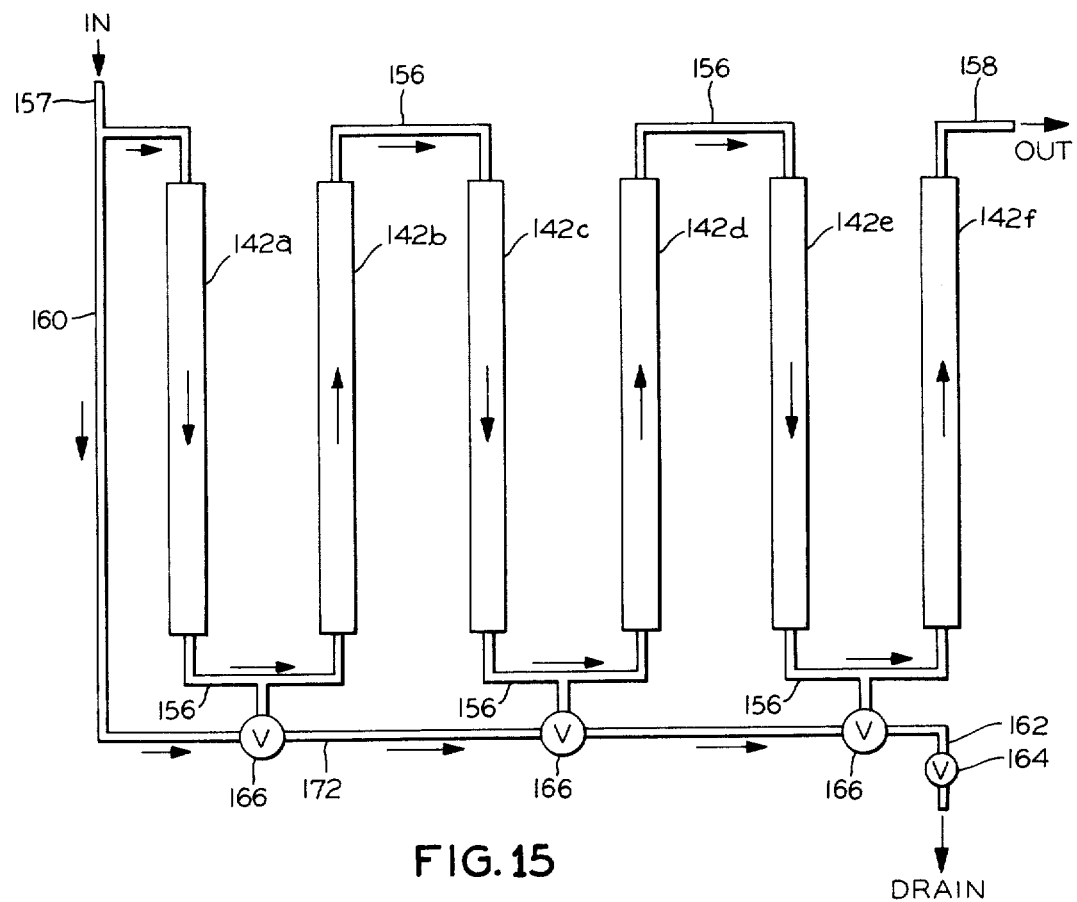
FIG. 15 is a diagrammatic illustration of the filter embodiment of FIGS. 11-14.

Turning first to the embodiment of FIGS. 1-10, the water purifier thereof has the operating elements arranged as to be compactly disposed within a housing illustrated in FIG. 1 and generally designated by the numeral 10. In the illustrated embodiment, the housing 10 includes a lower portion 12 disposed upon four legs 14 and an upper portion 16 having a plurality of vents 18 provided therein. Purified water from the unit is discharged through the outlet 20 of the spigot assembly 22 by pressing upon the discharge button 24. The unit is placed in operation by the switch 25 in the power supply represented by the fragmentarily illustrated power cord 21, and the "on" condition is indicated by the light indicator 23. Not seen in this illustration are the water conduits.

The overall internal assembly is best seen by reference to FIGS. 2 and 3 wherein water supplied to the boiler assembly generally designated by the numeral 26 is heated to produce steam vapor which is condensed in the condenser assembly generally designated by the numeral 28, and the condensate is then filtered in the filter assembly generally designated by the numeral 30 prior to passage and storage in the tank generally designated by the numeral 32. Water entering the unit through the water inlet 34 is supplied to the condenser assembly 28 or channeled through the filter assembly 30 for passage into the boiler assembly 26 as will be described more in detail hereinafter.

Turning first in detail to the water supply system, the illustrated embodiment is intended for automatic operation and is therefore coupled to a source of water under pressure through the water inlet 34. Water entering the inlet passes through the internal conduit 36 to the T-connection 38. If the solenoid valve 40 is in the open position, water will pass through the conduit 42 into one coil 44 of the filter assembly 30. Water which is passed through the coil 44 may then pass into the interior of the boiler assembly 26 through the conduit 46 and check valve 48. Water passing to the T-connection 38 through the conduit 36 may be directed into the condenser assembly 28 through the conduit 50 if the solenoid valve 52 is in the open condition. Cooling water is discharged from the condenser assembly 28 through the conduit 54 and may be discharged from the unit through the water outlet 56.

Turning now in detail to the boiler assembly 26 which is best seen in FIGS. 3,4,8 and 9, it is generally comprised of a large cylindrical tank 58 seated upon the base 60, and a stack 62 which extends coaxially upwardly from the tank 58. Water is introduced into the interior of the tank 58 through the conduit 46 in response to a signal from the level sensor 64 when the water level drops therebelow, and the water flow is terminated by a signal from the level sensor 66 when the water reaches its level. The water in the tank 58 is rapidly heated to its boiling point by the heater 68 which in the illustrated embodiment is a rod type unit threadably engaged in the fitting 70 and connected to a power source through the electrical leads 72. A pressure relief valve 74 is provided in the upper portion of the tank 58, and a drain ditting 76 with a solenoid valve 78 is also provided at the bottom of the tank 58. Upon inactivation of the purifier unit, water in the tank 58 will drain through the drain fitting 76 and the water outlet 56 upon opening of the valve 78 through a conduit 80 (not shown in FIG. 4 but seen in FIG. 10).

The stack 62 includes a cylindrical base 82 affixed to the top of the tank 58, an elongated tubular portion 84 secured to the base 82 by the coupling assembly 86, and the cap 88. As best seen in FIG. 8, the top wall 90 of the tank 58 has a multiplicity of perforations 92 therein inwardly of the periphery of the base 82. Disposed over the perforations 92 within the base 82 is a baffle member 94 having a multiplicity of perforations 96 which are offset from the perforations 92. A screen member 98 is disposed over the baffle member 94. Threadedly seated within the cap 88 and extending downwardly into the chamber of the stack 62 is an electrical rod resistance heater 102 which is connected to a suitable power supply by the leads 104. Filling the space about the heater 102 is a screen member 103 extending longitudinally therealong and wound thereabout to provide a multiplicity of screen plies.

Turning now to FIGS. 5-7, the construction of the condenser assembly 28 can be seen in considerable detail. Effectively there are provided three concentric passages by the innermost spiral tube element 106, by the intermediate cylindrical tube 108 and by the outer cylindrical tube 110. As seen, the spiral tube element 106 is open at both ends and projects beyond the ends of the intermediate cylindrical tube 108 which is of larger diameter and welded at its ends thereto so as to define a chamber 112 therebetween. The outer cylindrical tube 110 in turn extends from a point spaced from the inlet end of the condenser assembly 28 to a point spaced beyond the end of the spiral tube element 106. It is welded to the intermediate cylindrical tube 108 at its end adjacent the inlet end and is provided with an end cap 114 at its other end. In this manner there is defined a generally annular passage 116 between the intermediate cylindrical tube 108 and the outer cylindrical tube 110.

Cooling water from the conduit 50 enters the cooling water inlet 118 through the fitting 120 and passes through the length of the spiral tube element 106. After it is discharged from the opposite end of the spiral tube element 106, it flows into the annular passage 116 and hence through the outlet fitting 122 to the conduit 54. Steam from the boiler assembly 26 passing upwardly through the stack 62 flows through the discharge fitting 100 and into the steam inlet fitting 124 of the condenser assembly 28. It then passes about the cooled outer surface of the spiral tube element 106 in agitated flow within the chamber 112 and is condensed therein; the condensate is then discharged through the discharge fitting 126.

The condensate then passes through the conduit 128 into the filter assembly 30 which is comprised of two concentric coils 44 and 130 each packed with a filter medium. The coil 44 is utilized to treat the water being fed to the boiler conveniently comprises the outer spiral and the coil 130 which is utilized to treat the condensate conveniently comprises the inner spiral. Both coils are conventionally disposed within a common housing 132, and the concentric spiral coil arrangement permits a relatively long filter flow path for both streams within a relatively compact volume. Following passage through the filter coil 130 which is fragmentarily illustrated in solid line and borken line in part to illustrate the filter medium 131 contained therein, the condensate is charged through the conduit 134 into the storage tank 32.

As required, the user may then draw purified water from the tank 32 through the spigot assembly 22.

Turning now to FIGS. 11-15, therein illustrated is another type of filter assembly for treating the condensate. Disposed within the generally cylindrical housing 140 are a series of six vertically disposed packed tubes generally designated by the numerals 142a-f, each comprising a cylindrical tubular element 144, end caps 146, 148 and filter medium 150. The end caps 146, 148 seat in transverse headers 152, 154 in which there are provided interconnecting conduits 156.

Condensate entering the housing 140 through the inlet fitting 157 passes downwardly through the tube 142a through the conduit 156 and thence upwardly through the tube 142b, downwardly through the tube 142c, upwardly through the tube 142d, downwardly through the tube 142e, and upwardly through the tube 142f. It is then discharged through the outlet fitting 158.

A bypass tube 160 is also provided which will permit flow of condensate through the housing 140 directly to the drain fitting 162 in response to operation of the valve 164. Below the header 154 is a valve housing member 168 containing a multiplicity of ball valves 166 operating to open or close drains 170 aligned with the several tubes 142 and interconnecting conduits 156. These ball valves 166 in turn are interconnected by the drain passage 172.

During startup, condensate will flow not only into the tube 142a but also into the bypass tube 160 and the drain passage 172. Because of the lesser resistance to flow, this initial condensate will close the ball valves 166, thus allowing the condensate flowing through the tubes 142 to pass through the conduits 156 and discharge through the outlet fitting 158. Upon shutdown, the valve 164 is opened and the pressure in the drain passage 172 relieved so that the ball valves 166 open and condensate drains from the tubes 142 and conduits 156.

The high and low water sensors 64,66 and the several electrically operated valves 40,48,52 and 78, as well as the heating elements 68 and 102 are all electrically connected to a suitable control circuit 27 which is actuated when the switch 25 is turned to the "on" position. This control circuit is of a conventional type to perform the switching operations which are described in detail herein.

Turning now to operation of the embodiments of the apparatus illustrated in FIGS. 1-10, the unit is installed with connections from the inlet fitting 34 to a source of water under pressure and the outlet fitting 56 is connected to a drain system. In addition, the electrical power supply cord (not shown) is connected to a source of electrical power. Upon actuation of the switch 25 the valve 78 is closed and the solenoid valve 40 is opened and water flows through the conduit 42 into the filter coil 44 and thence through the conduit 46 and check valve 48 until the water level within the tank 58 reaches the upper level sensor 66, at which time the solenoid valve 40 is closed and the heater 68 and heater 102 are actuated. Concurrently, the solenoid valve 52 is opened and cooling water begins to flow through the condenser assembly 28.

As the heater 68 raises the temperature of the water within the tank 58 to boiling, steam vapors pass upwardly into the stack 62. Depending upon the contamination of the water, substantial foaming may occur and water droplets containing contaminants may be carried by the steam vapors upwardly in the upper portion of the tank 58. Some of the water droplets are removed from the steam vapors by the baffle arrangement provided by the offset perforations 92 and 96. The vapor passing upwardly through the baffle member 94 then comes into contact with the wire screen member 98 and the wire screen member 103 which are heated by the heater rod 102 to a temperature substantially above the boiling point of water to effect immediate vaporization of the water. As a result, any suspended droplets in the vapor are converted into steam vapors and the impurities contained therein fall downwardly or collect upon the surface of the screen members 98 and 103. The large surface contact area and tortuous passage defined by the screen members 98 and 103 ensure that only steam vapor free from droplets and suspended materials will exit through the discharge fitting 100 at the top of the stack 62.

The vapor exiting from the stack 62 through the discharge fitting 100 then passes into the condenser assembly 28 wherein it flows about the chilled surface of the spiral tube element 106 as it passes along the length of the chamber 112. During its flow it is converted from steam vapor to a relatively pure water condensate and this condensate is then discharged from the condenser assembly 28 through the discharge fitting 126 and passed downwardly through the conduit 128 and the filter medium within the filter coil 130 which effects further removal of any impurities contained therein. The filtered water then passes from the filter assembly 30 to the tank 32 through the conduit 134 and is available for utilization by withdrawal therefrom through the spigot assembly 22. The light indicator 23 indicates the "on" condition of the apparatus and, if so desired, an additional light indicator (not shown) may be provided to indicate the presence of water within the tank 32.

When the water level within the boiler tank 58 drops to the level of the sensor 64, the solenoid valve 40 opens and water again flows through the filter coil 44, check valve 48 and conduit 46 until the water level within the boiler tank 58 again reaches the level of the sensor 66. It will be appreciated that the check valve 48 is normally closed when the solenoid valve 40 is closed to prevent steam from escaping through the conduit 46 from the boiler tank 58. During this refilling operation, the solenoid 52 may close to terminate flow of cooling water to the condenser assembly 28.

When the switch 25 is deactivated, both solenoid valves 40 and 52 close to terminate flow of water from the water inlet 34 through the apparatus, and current to the heaters 68, 102 is terminated. In addition, the valve 78 opens and water within the boiler tank 58 drains out through the water outlet 56.

To prevent undue pressure buildup within the boiler tank 58 in the event of some malfunction, the pressure relief valve 74 is operable as a safety valve. From time to time it will be desirable to clean the screen members 98, 103 of the stack 62 to remove any solids which have collected therein. Similarly, it will be desirable to clean the body of the boiler tank 58 to remove solids which may have collected on the sides thereof, particularly when solutions having a high degree of salinity are being treated. This cleaning operation is simply effected by reason of the various threaded couplings which are provided to permit disassembly of these two components.

From time to time it may be desirable to backwash the filter coils 44, 130 and/or to replace the filter medium therewithin. Here again, the components may be readily removed from the assembly for this purpose by reason of the threaded couplings which are provided.

The filter embodiment illustrated in FIGS. 11–15 operates differently in that actuation of the switch 25 closes the drain valve 164 from the filter assembly 140. As condensate flows into the filter assembly 140 through the inlet 157 it initially flows into the bypass tube 160 and drain passage 172 to develop pressure therein to close the ball valves 166. Thereafter, the condensate flows into and through the tubes 142a–f and conduits 156 and is discharged through the outlet 158 to the tank 32. Upon deenergization of the switch 24, the valve 164 is opened causing the pressure in the drain passage 172 to drop and the ball valves 166 to open. Condensate in the several tubes 142a–f and conduits 156 thus drains into the drain passage 172 and out through the drain fitting 162.

In order to provide a versatile and long lasting structure, the boiler assembly, filter assembly and tank are desirably constructed of stainless steel or other highly corrosion resistant metal. It will be appreciated that water exhibiting salinity will be extremely corrosive at the boiling and higher temperatures employed herein. Thus, the several components of the boiler assembly 28 should all be comprised of corrosion resistant metals or at least their exposed surfaces. Stainless stell screen members have been found to be long lived despite the high temperatures and corrosive conditions to which they are exposed. Although other contact surface providing media may be employed such as packing balls and rings, screen members have proven highly advantageous because of the high heat conductivity, ease of assembly and disassembly, and ease of cleaning.

The filter coils may be fabricated from metallic tubing; however, inert plastic tubing has also proven satisfactory. The various fittings and conduits may be fabricated from any corosion resistant material, although the particular material selected will be dependent upon the temperature of service at the particular location. In practice, stainless steel tubing and fittings may be employed throughout to minimize the likelihood of galvanic corrosion.

In the illustrated embodiment, electrical resistance heaters have been employed in the boiler and in the stack. If so desired, gas fired burners may be substituted for either or both of these electrical resistance heating elements. Obviously, other forms of valves may be substituted for those illustrated and/or the valve arrangement may be modified. Manual filling may also be employed, and the water entering the boiler may be preheated by heat exchange contact either with the steam vapors or the condensing water. In fact, a portion of the condensing water output may be employed as the feedstock to the boiler.

Illustrative of the efficacy of the water purifier of the present invention is the following data with respect to an operating unit constructed substantially in accordance with FIGS. 1–10. A boiler tank having an internal diameter of $3\frac{1}{2}$ inches, has a water volume of 64 cubic inches at the level of the low sensor and a water volume of about 93 cubic inches at the level of the high sensor. A 1500 watt resistance heater rod is provided in the boiler tank, and a 500 watt resistance heater rod is provided in the stack which heats the stainless steel screen members to red heat, i.e., about 1700° F. This unit is found to produce one quart of highly purified water in 24 minutes.

In tests conducted on tap water of the Jefferson Parish Waterworks in Louisiana, chloroform and carbon tetrachloride were reduced from 160 and 5 parts per billion respectively, to 1.7 and 1.2 parts per billion respectively. The specific conductants of this tap water was reduced from 330 micromhos per centimeter to 20 micromhos per centimeter.

In a second test conducted on bayou water containing raw sewage, the specific conductance was reduced from 1700 to 370 micromhos per cubic centimeter; the true color (Pt-Co units) was reduced from 120 to 0; and the total coliform bacteria count was reduced from 1.5 $\times 10^3$ to 0 per 100 milliliters.

In another test involving the treatment of sea water, conductivity at 25° C, was reduced from 40,000 to 89 micromhos per centimeter.

From the foregoing detailed specifiction and examples, it can be seen that the water purifier unit of the present invention provides highly efficient action in treating water containing both solid and dissolved impurities so as to provide a highly potable water supply. The unit is relatively simple to fabricate from long lived components, and the components may be readily disassembled for periodic cleaning and maintenance.

Having thus described the invention, I claim:

1. In a water purification apparatus, the combination comprising:
   A. a boiler assembly having
      1. a water-boiling tank portion and
      2. a vapor receiving and conducting portion thereabove,
         said tank portion including a first chamber, a water inlet into said chamber and heating means adapted to heat water in said chamber to the boiling point and produce vaporization thereof,
         said vapor-receiving and conducting portion including
            a. a second chamber therewithin,
            b. contact surface means occupying substantially the entire transverse dimension of at least a portion of the length of said second chamber and
            c. heating means for heating said contact surface means to a temperature substantially above the vaporization temperature of water to effect vaporization of water particles which may come into contact therewith,
         said boiler assembly including a passage between said first chamber and said second chamber for passage of vapors from said first chamber to said second chamber;
   B. a condenser assembly connected to said vapor-receiving and conducting portion for receiving vapors passing therethrough and providing indirect heat exchange contact between the vapors and a cooling medium;
   C. a filter assembly connected to said condenser assembly for receiving condensate therefrom and effecting filtration thereof; and
   D. storage tank means for receiving filtrate from said filter assembly.

2. The water purification assembly of claim 1 wherein said boiler assembly includes baffle members in said passage between said first chamber of said tank portion and said second chamber of said vapor-receiving and conducting portion.

3. The water purification assembly of claim 1 wherein said heating means of said vapor-receiving and conducting portion of said boiler assembly includes a centrally disposed rod and wherein said contact surface means includes a screen member wound thereabout.

4. The water purification assembly of claim 3 wherein said contact surface means includes a second screen member disposed below said first mentioned screen member and extending transversely of said chamber.

5. The water purification assembly of claim 1 wherein said boiler assembly includes level sensing means for sensing the level of water within said tank portion.

6. The water purification assembly of claim 1 wherein said boiler assembly includes water supply means adapted to be connected to a source of water under pressure and to said water inlet of said boiler assembly, and a valve in said water supply means for admitting water under pressure to said water inlet of said tank portion.

7. The water purification assembly of claim 6 wherein said boiler assembly includes level sensing means for sensing the level of water within said first chamber of said tank portion and wherein said valve is responsive to a signal generated by said level sensing means to maintain the water level within said tank portion within a predetermined volume.

8. The water purification assembly of claim 1 wherein said tank of said boiler assembly includes a drain and a valve operable to open and close said drain.

9. The water purification assembly of claim 1 wherein said condenser assembly includes at least a plurality of concentrically disposed tubes defining concentric chambers, one of said chambers communicating with said vapor-receiving and conducting portion for passage of the condensate therethrough and an adjacent chamber communicating with a source of cooling medium to effect heat exchange therebetween.

10. The water purification assembly of claim 1 wherein said condenser assembly includes three concentrically disposed tubes defining three concentric chambers, the center and outer chambers being interconnected at one end thereof, and one of said interconnected chambers being connected to a source of cooling medium at the other end thereof, whereby the cooling medium will flow in one direction through one of said chambers and in the opposite direction in the other of said chambers; the intermediate chamber communicating with said vapor-receiving and conducting portion of said boiler assembly for passage of the condensate therethrough in indirect heat exchange contact with the cooling medium flowing in the center and outer chambers.

11. The water purification assembly of claim 9 wherein said adjacent chamber is connected to a source of water under pressure through a valve operable to terminate water flow therethrough.

12. The water purification assembly of claim 1 wherein said filter assembly includes additional filter means connected to a source of water and to said water inlet of said boiler assembly for filtering water from the source prior to passage into said tank portion.

13. The water purification assembly of claim 1 wherein said filter assembly includes an elongated coil and filter medium within said coil providing the flow passage therethrough.

14. The water purification assembly of claim 7 wherein said condenser assembly includes a connection to a source of water under pressure and a valve in said connection operable to terminate water flow therethrough; and wherein there is included control means operative to supply a signal to said valve in the water supply means connection to said water inlet of said boiler assembly and to supply a signal to the valve in the water supply means to said condenser assembly, said control means closing one of said valves at the time of opening the other of said valves.

15. The water purification assembly of claim 14 wherein said tank of said boiler assembly includes a drain and a valve operable to open and close said drain; wherein each of said valves is electrically actuated; and wherein there is included an electric connection to a source of electrical power with a switch therein, opening of said switch closing said valves in the connections to the sources of water under pressure to said condenser means and said water inlet to said tank portion and concurrently opening said valve in the drain of said boiler assembly tank.

16. In a water purification apparatus, the combination comprising:
   A. a boiler tank having
      1. a chamber therein,
      2. a water inlet into said chamber and
      3. heating means adapted to heat water in said chamber to the boiling point and produce vaporization thereof,
   B. a stack on said boiler tank having
      1. a chamber therewith,
      2. contact surface means occupying substantially the entire transverse dimension of at least a portion of the length of said stack chamber and
      3. heating means for heating said contact surface means to a temperature above the boiling temperature of water to effect vaporization of water particles which may come into contact therewith;
   C. a passage between said boiler tank chamber and said stack chamber for passage of vapors therebetween;
   D. a condenser assembly connected to said vapor-receiving and conducting portion for receiving vapors passing therethrough and providing indirect heat exchange contact between the vapors and a cooling medium;
   E. a filter assembly connected to said condenser assembly for receiving condensate therefrom and effecting filtration thereof; and
   D. storage tank means for receiving filtrate from said filter assembly.

17. The water purification apparatus of claim 16 wherein said stack includes baffle members adjacent said passages from said chamber of said boiler tank; wherein said heating means of said stack includes a centrally disposed heater rod within said stack chamber; and wherein said contact surface means includes a screen member wound about said heater rod.

18. The water purification apparatus of claim 17 wherein said contact surface means includes a second screen member disposed below said first mentioned screen member and extending transversely of said stack chamber.

19. In a method for water purification, the steps comprising:
   A. introducing into a chamber of a boiler tank water containing impurities;
   B. heating said water in said boiler tank to produce steam therefrom;
   C. conducting said steam outwardly from said boiler tank chamber into a second chamber spaced therefrom;
   D. heating a contact surface member in said second chamber to a temperature substantially above the boiling point of water;
   E. passing said steam from said boiler tank chamber over said contact surface member to vaporize any entrained water droplets therein;
   F. condensing said steam after passage through said surface contact member; and
   G. collecting the condensate.

20. The water purification method of claim 19 wherein there is included the step of filtering said water prior to introduction to said boiler tank chamber.

21. The water purification method of claim 19 wherein there is included the step of filtering the condensate.

* * * * *